US006771591B1

(12) United States Patent
Belotserkovsky et al.

(10) Patent No.: US 6,771,591 B1
(45) Date of Patent: *Aug. 3, 2004

(54) METHOD AND SYSTEM FOR PROCESSING ORTHOGONAL FREQUENCY DIVISION MULTIPLEXED SIGNALS

(75) Inventors: Maxim B. Belotserkovsky, Indianapolis, IN (US); Louis Robert Litwin, Jr., Carmel, IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 548 days.

This patent is subject to a terminal disclaimer.

(21) Appl. No.: 09/630,005

(22) Filed: Jul. 31, 2000

(51) Int. Cl.[7] .............................................. H04J 11/00
(52) U.S. Cl. ...................... 370/210; 370/208; 370/281; 370/290; 370/295; 370/292; 370/310; 375/232; 375/260; 375/350; 375/355; 375/362
(58) Field of Search ................................ 370/202, 203, 370/206, 207, 208, 252, 277, 278, 281, 290, 210, 292, 295, 310; 375/229, 230, 231, 232, 233, 234, 235, 316, 354, 355, 362, 260, 350

(56) References Cited

U.S. PATENT DOCUMENTS

| | | | | |
|---|---|---|---|---|
| 5,282,222 A | | 1/1994 | Fattouche et al. ............. 375/1 |
| 5,285,474 A | | 2/1994 | Chow et al. ................... 375/13 |
| 5,550,812 A | * | 8/1996 | Philips .......................... 370/19 |
| 5,796,814 A | | 8/1998 | Brajal et al. ................. 375/232 |
| 5,848,107 A | | 12/1998 | Philips ....................... 345/342 |
| 5,920,598 A | | 7/1999 | Hyakudai et al. ........... 375/316 |
| 5,953,311 A | | 9/1999 | Davies et al. ............... 370/210 |
| 5,963,592 A | * | 10/1999 | Kim ............................ 375/232 |
| 5,995,568 A | * | 11/1999 | Molnar et al. .............. 375/354 |
| 6,359,938 B1 | * | 3/2002 | Keevill et al. .............. 375/316 |
| 6,421,401 B1 | * | 7/2002 | Palin .......................... 375/343 |
| 6,483,553 B1 | * | 11/2002 | Jung .......................... 348/731 |
| 6,487,253 B1 | * | 11/2002 | Jones, IV et al. ........... 375/260 |

FOREIGN PATENT DOCUMENTS

| | | | |
|---|---|---|---|
| EP | 0898381 | 2/1999 | ........... H04B/7/005 |
| EP | 0903898 | 3/1999 | ........... H04L/27/26 |
| WO | WO98/39872 | 9/1998 | ............. H04L/5/06 |
| WO | WO98/39886 | 9/1998 | ........... H04L/27/26 |
| WO | WO99/17492 | 4/1999 | ............. H04L/5/06 |
| WO | WO99/17493 | 4/1999 | ............. H04L/5/06 |
| WO | WO99/27671 | 6/1999 | ........... H04J/11/00 |

OTHER PUBLICATIONS

J. A. C. Bingham, "Multicarrier Modulation For Data Transmission: An Idea Whose Time Has Come", May 1990—IEEE Communications Magazine.

* cited by examiner

Primary Examiner—Dang Ton
Assistant Examiner—Shick Hom
(74) Attorney, Agent, or Firm—Joseph S. Tripoli; Ronald H. Kurdyla; Vincent E. Duffy (57) ABSTRACT

An Orthogonal Frequency Division Multiplexing (OFDM) receiver that compensates for FFT window drift by extracting a training symbol from a fast Fourier transformed OFDM signal, and processing the extracted training symbol to derive an FFT window adjustment factor and an associated equalizer tap initialization value. The OFDM receiver controls the position of an FFT window and the initialization of equalizer taps using the FFT adjustment factor and equalizer tap initialization value. The OFDM receiver preferably filters the fast Fourier transformed OFDM signal to remove additive channel noise and increase the likelihood of reliable equalizer tap initialization in a low SNR environment.

17 Claims, 7 Drawing Sheets

METHOD AND SYSTEM FOR PROCESSING ORTHOGONAL FREQUENCY DIVISION MULTIPLEXED SIGNALS

FIELD OF THE INVENTION

The present invention relates to processing orthogonal frequency division multiplexed (OFDM) signals.

BACKGROUND OF THE INVENTION

A wireless LAN (WLAN) is a flexible data communications system implemented as an extension to, or as an alternative for, a wired LAN within a building or campus. Using electromagnetic waves, WLANs transmit and receive data over the air, minimizing the need for wired connections. Thus, WLANs combine data connectivity with user mobility, and, through simplified configuration, enable movable LANs. Some industries that have benefited from the productivity gains of using portable terminals (e.g., notebook computers) to transmit and receive real-time information are the digital home networking, health-care, retail, manufacturing, and warehousing industries.

Manufacturers of WLANs have a range of transmission technologies to choose from when designing a WLAN. Some exemplary technologies are multicarrier systems, spread spectrum systems, narrowband systems, and infrared systems. Although each system has its own benefits and detriments, one particular type of multicarrier transmission system, orthogonal frequency division multiplexing (OFDM), has proven to be exceptionally useful for WLAN communications.

OFDM is a robust technique for efficiently transmitting data over a channel. The technique uses a plurality of sub-carrier frequencies (sub-carriers) within a channel bandwidth to transmit data. These sub-carriers are arranged for optimal bandwidth efficiency compared to conventional frequency division multiplexing (FDM) which can waste portions of the channel bandwidth in order to separate and isolate the sub-carrier frequency spectra and thereby avoid intercarrier interference (ICI). By contrast, although the frequency spectra of OFDM sub-carriers overlap significantly within the OFDM channel bandwidth, OFDM nonetheless allows resolution and recovery of the information that has been modulated onto each sub-carrier.

The transmission of data through a channel via OFDM signals also provides several other advantages over more conventional transmission techniques. Some of these advantages are a tolerance to multipath delay spread and frequency selective fading, efficient spectrum usage, simplified sub-channel equalization, and good interference properties.

Figure 1:
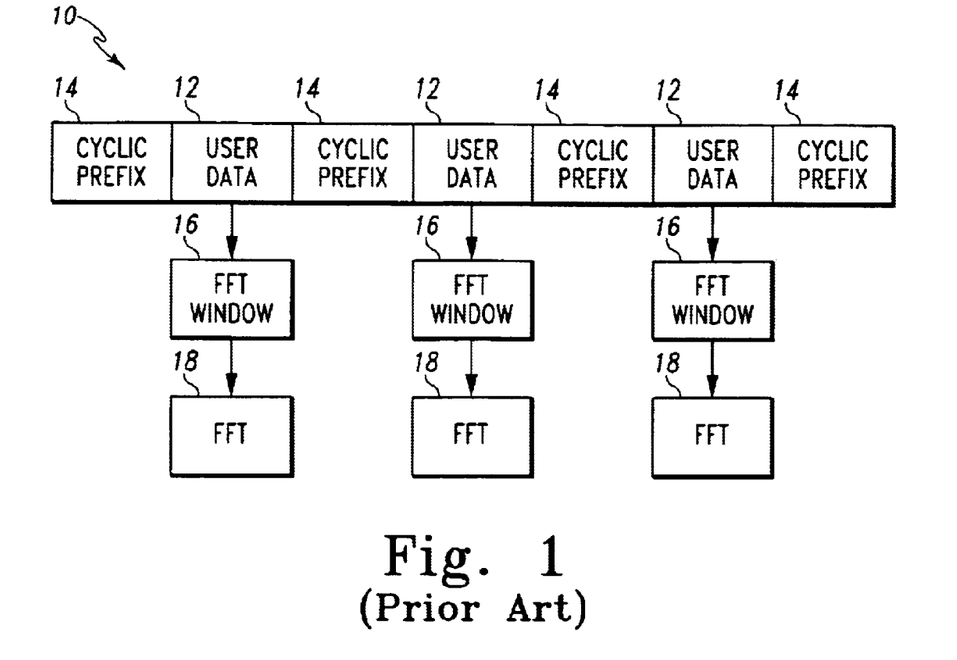
FIG. 1 is a diagram of an OFDM signal having user data and cyclic prefix portions, and associated processors.

Referring now to FIG. 1, an OFDM signal 10 is transmitted as blocks of user data 12 separated by guard intervals known as cyclic prefixes 14. A cyclic prefix 14 is a copy of a portion of an adjacent block of user data 12 and is used to reduce Inter-Symbol Interference (ISI) caused by multipath fading. More particularly, only cyclic prefixes 14, as opposed to user data 12, are effected by ISI, as is known by those skilled in the art. Thus the removal of cyclic prefixes 14 by an OFDM receiver removes the effects of ISI from the received OFDM signal.

Figure 2:
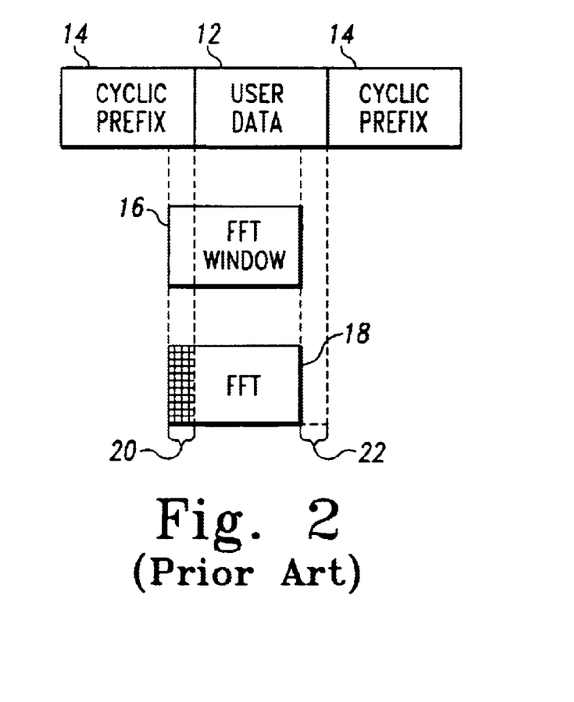
FIG. 2 is diagram illustrating the presence of FFT window drift.

At the OFDM receiver a received OFDM signal 10 is digitized or sampled to convert the OFDM signal from an analog to a digital signal. Afterwards, the OFDM receiver applies Fast Fourier Transform (FFT) windows to the OFDM signal to remove the cyclic prefixes from a received OFDM signal. Ideally, an OFDM window 16 only passes user data 12 to an FFT unit 18 and discards cyclic prefixes 14. However, if there is a sampling frequency offset between the OFDM transmitter and the OFDM receiver, FFT window 16 may drift beyond the boundaries of user data 12. If this drift occurs, as shown in FIG. 2, a portion or sample 20 of cyclic prefix 14 may be passed to FFT unit 18 and a portion or sample 22 of user data 12 may be lost. As a result, the window drifting effect may result in the presence of ISI in a received OFDM signal. Furthermore, an offset of FFT window 16 will result in a phase rotation in the output of FFT unit 18. The rotation occurs because a time shift in the time domain results in a phase rotation in the frequency domain. The phase rotation may generate errors in the user data recovered by the OFDM receiver. The present invention is directed to the correction of this problem.

SUMMARY OF THE INVENTION

An OFDM receiver extracts a training symbol from a fast Fourier transformed OFDM signal and processes the extracted training symbol to derive an FFT window adjustment factor and an associated equalizer tap initialization value that is pre-compensated to account for the effects of the FFT window adjustment value. The OFDM receiver controls the position of an FFT window and the initialization of equalizer taps using the FFT adjustment factor and equalizer tap initialization value. The OFDM receiver preferably filters the fast Fourier transformed OFDM signal to remove additive channel noise and increase the likelihood of reliable equalizer tap initialization in a low SNR environment.

DETAILED DESCRIPTION OF THE PREFERRED EMBODIMENT

The characteristics and advantages of the present invention will become more apparent from the following description, given by way of example.

Figure 3:
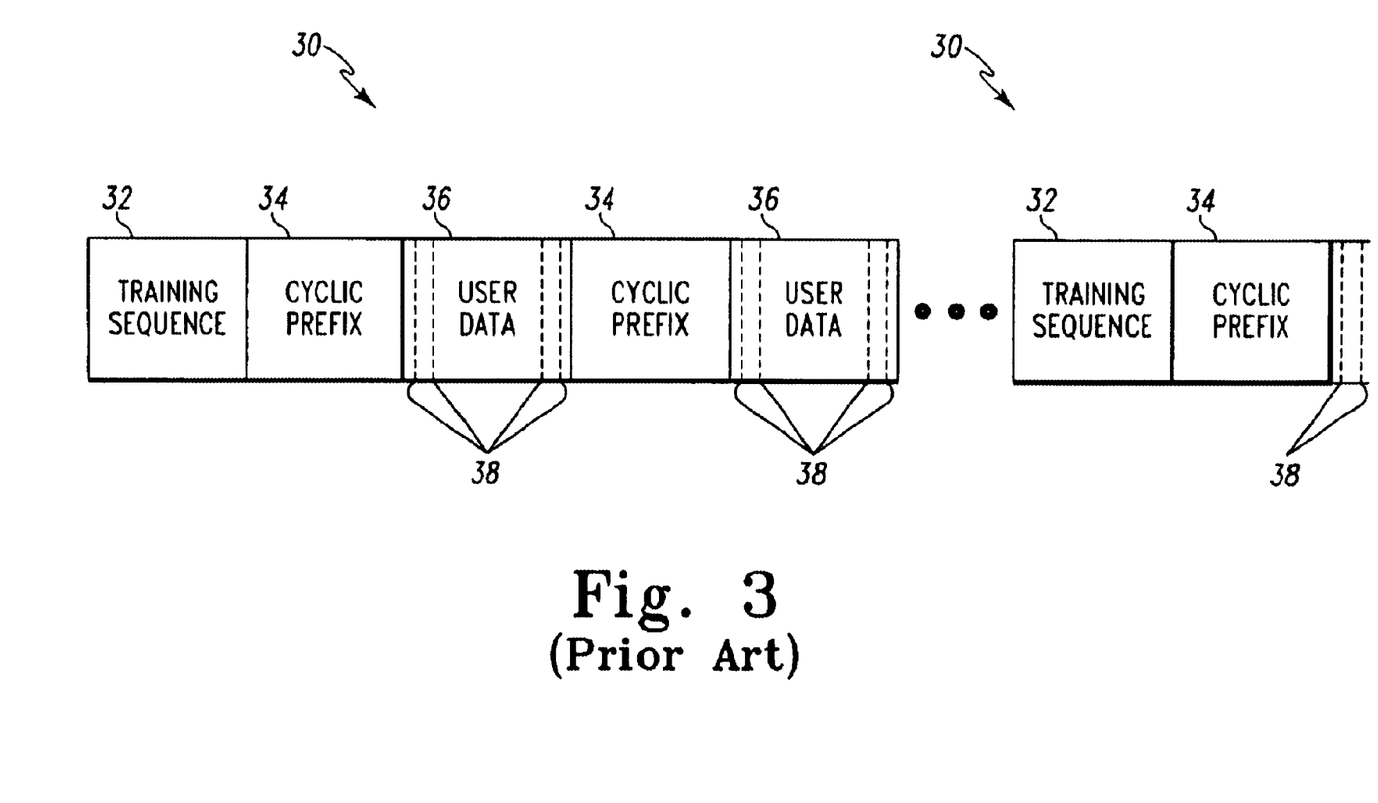
FIG. 3 is a diagram illustrating the placement of a training sequence, user data, and pilot signals within an OFDM symbol frame according to the present invention.

Turning to FIG. 3, an exemplary OFDM symbol frame 30 of the present invention is shown. Symbol frame 30 includes a training sequence or symbol 32 containing known transmission values for each subcarrier in the OFDM carrier, and a predetermined number of cyclic prefix 34 and user data 36 pairs. For example, the proposed ETSI-BRAN HIPERLAN/2(Europe) and IEEE 802.11a (USA) wireless LAN standards, herein incorporated by reference, assign 64 known values or subsymbols (i.e., 52 non-zero values and 12 zero values) to selected training symbols of a training sequence (e.g., "training symbol C" of the proposed ETSI standard and "long OFDM training symbol" of the proposed IEEE standard). User data 36 has a predetermined number of pilots 38, also containing known transmission values, embedded on predetermined subcarriers. For example, the proposed ETSI and IEEE standards have four pilots located at bins or subcarriers ±7 and ±21.

Figure 4:
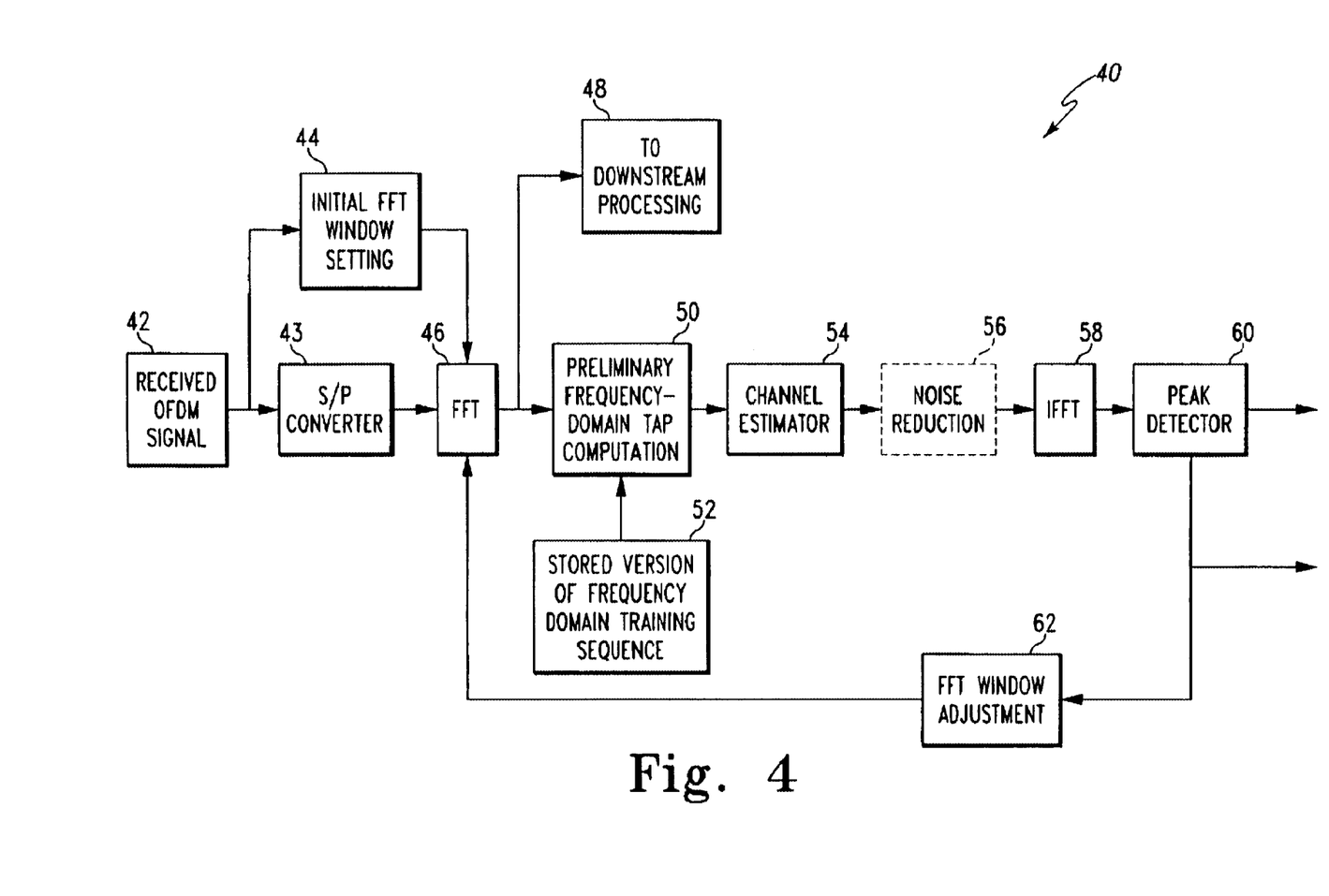
FIGS. 4 and 5 are a block diagram illustrating a window shift correction and equalizer tap initialization arrangement for an OFDM receiver according to the present invention.
Figure 5:
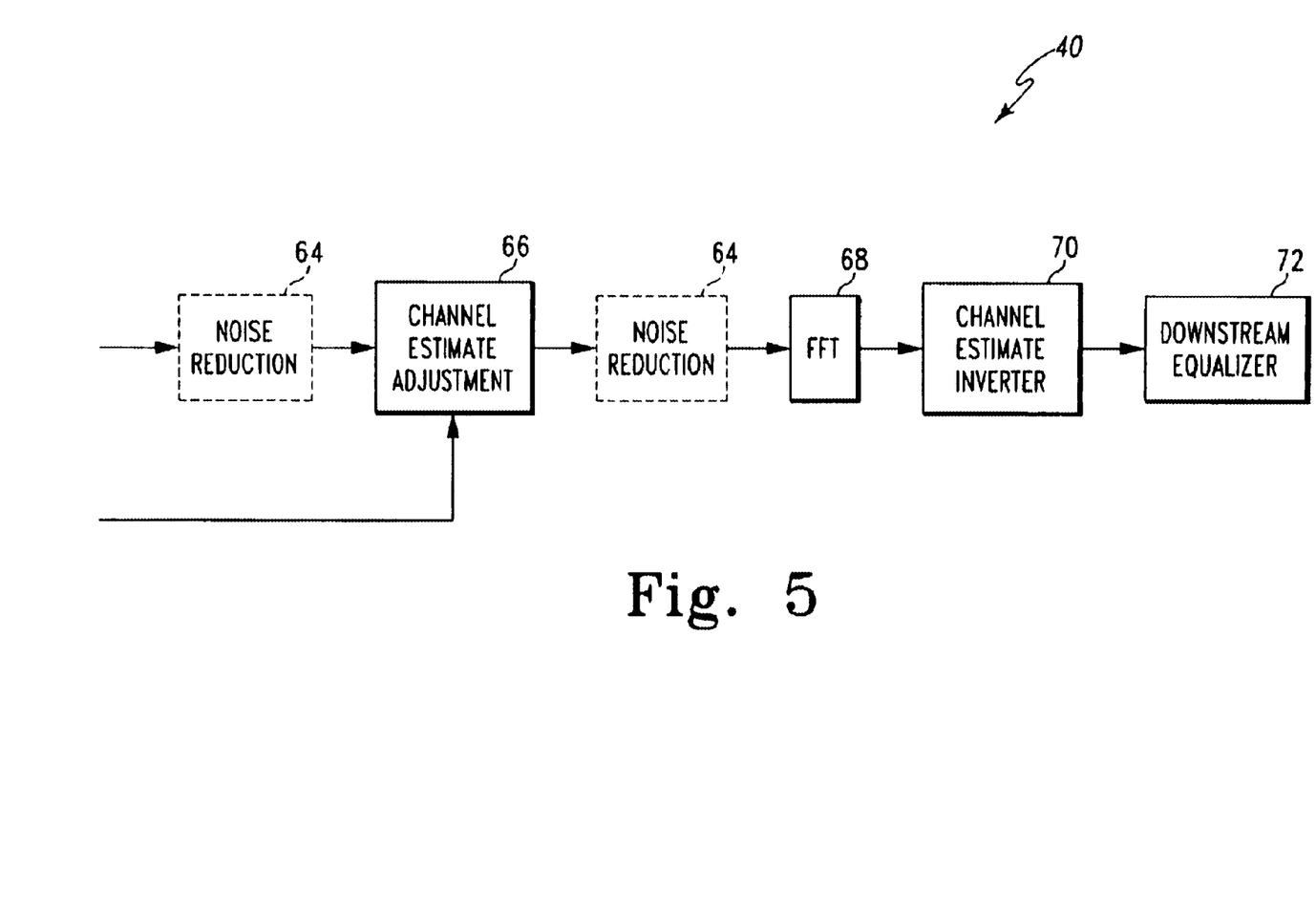

Referring now to FIGS. 4 and 5, an FFT window synchronization and equalizer tap initialization system 40 of the present invention is shown. It should be noted that system 40 may be embodied in software, hardware, or some combination thereof. For example, system 40 may be part of an WLAN adapter that is implemented as a PC card for a notebook or palmtop computer, as a card in a desktop computer, or integrated within a hand-held computer or a home networking terminal. System 40 is coupled to a source 42 of OFDM time-domain samples (e.g., the output of an ADC) that has a sampling frequency offset with respect to the sampling frequency of an OFDM transmitter. As noted above, such an offset could cause an FFT window drift which, in turn, may result in a phase rotation in the output of an FFT unit and ISI. System 40 includes an initial FFT window setting unit 44 coupled to source 42 and an FFT unit 46 coupled to source 42 via a serial to parallel converter 43. Initial FFT window setting unit 44 obtains an initial estimate of the FFT window position and triggers FFT unit 46 when the samples from source 42 fall within the estimated window position. Initial FFT window setting unit 44 may use known window synch techniques such as detection of cross-correlation peaks or autocorrelation peaks of a known training sequence (e.g., training sequence 32 of FIG. 3). Initial FFT window setting unit 44 obtains an approximate (within several samples of the correct window position) initial estimate of the window position. Afterwards, the window position is finely adjusted, as described in further detail below. It should be noted that the coarse FFT window position set by unit 44 is preferably within a known sample range from the correct FFT window setting.

The output of FFT unit 46 is passed to downstream processing units 48 and to a preliminary frequency-domain tap computation unit 50. Downstream processing units 48 include an equalizer (shown in FIG. 5) for reducing the multi-path distortion effects of the channel that the OFDM signal is transmitted through.

Preliminary frequency-domain tap computation unit 50 computes preliminary frequency-domain equalizer tap values using a training symbol (e.g., a training symbol within training sequence 32 of FIG. 3) stored in a memory 52. A conventional technique for computing a tap value for each subcarrier is to set the tap for a subcarrier equal to the training subsymbol known to be transmitted on the subcarrier (as stored in memory 52) divided by the actual subsymbol output from FFT unit 46 on the subcarrier. The preliminary frequency-domain equalizer tap values are passed to a channel estimate unit 54 that inverts the equalizer tap values to form an estimate of the channel frequency response. (It should be noted that an alternative method for deriving the estimated channel frequency response is to solve for the channel estimate directly by dividing the output of FFT unit 46 by the known training symbol). A more precise channel estimate can be formed by averaging channel estimates over multiple training symbols.

The channel estimate is passed to an IFFT unit 58 (either directly or via an optional noise reduction unit 56 described in further detail below) that applies an Inverse Fast Fourier Transform such that the frequency-domain channel estimate is transformed into a time-domain channel estimate. The time-domain channel estimate is passed to a peak detector 60 that monitors the output of IFFT unit 58 for a maximum peak in the magnitude of the time-domain channel estimate. Peak detection unit 60 passes the time-domain channel estimate (either directly or via an optional noise reduction unit 64 described in further detail below) to a channel estimate adjustment unit 66. Peak detection unit 60 also outputs an index of a maximum peak within the channel estimate to channel estimate adjustment unit 66 as well as to an FFT window adjustment unit 62. A comparator circuit (not shown) may be used to detect the maximum peak. The comparator circuit monitors the magnitudes of the samples of the channel estimate and outputs the index of the sample having the largest magnitude. The index of the maximum peak corresponds to the strongest path of the OFDM channel (i.e., the OFDM subcarrier having the strongest path) and is compared to the FFT window location. Ideally, with no FFT window offset, the index of the main peak aligns with the beginning of the FFT window since the OFDM receiver is programmed to lock onto the OFDM signal that is from the strongest path. However, when a FFT window offset is present there will be a number of time-domain samples between the beginning of the FFT window and the index of the maximum peak. Thus, FFT window adjustment unit 62 can derive the window offset by counting the number of samples between the peak index and the beginning of the FFT window. Afterwards, FFT window adjustment unit 62 finely adjusts the window setting of FFT 46 to remove the window offset. To reduce the time and/or hardware required to locate a channel estimate peak, the search may be limited to a subset of channel estimate samples. For example, it may be known that the channel estimate will be within a subset of the time domain estimate samples since the initial FFT window setting unit 44 sets the initial FFT window within a known range from the correct FFT window setting, as discussed above.

Adjusting the FFT window introduces a phase shift in the output of FFT 46. As discussed above, the output of FFT 46 is passed to downstream processing units 48 including a downstream equalizer 72. If the phase shift generated by the adjustment of the FFT window is not compensated for when initializing the equalizer taps of equalizer 72, equalizer 72 will observe a discrete phase jump in the phase of the OFDM data received from FFT 46. The phase jump will cause sub-optimal equalizer performance as equalizer 72 attempts to compensate for the channel effects. Channel estimate adjustment unit 66 pre-compensates for the phase jump. More specifically, channel estimate adjustment unit 66 utilizes the maximum peak index received from peak detector 60 to circularly shift the channel estimate in the time domain such that a time shift representing the incorrect FFT window position is removed. In other words, the channel estimate is shifted in the time domain such that the equalizer taps derived from the channel estimate are pre-compensated for the discrete phase jump that occurs in the frequency-domain output of FFT 46 after the window of FFT 46 is finely adjusted.

The pre-compensated channel estimate is passed to an FFT 68 (either directly or via an optional noise reduction unit 64 described in further detail below) that applies a Fast Fourier Transform to the pre-compensated channel estimate. Application of the FFT transforms the pre-compensated time-domain channel estimate into a pre-compensated frequency-domain channel estimate. The pre-compensated frequency-domain channel estimate is passed to a channel estimate inverter 70 that inverts the pre-compensated frequency-domain channel estimate to form pre-compensated equalizer tap initialization values. As discussed above, the pre-compensated equalizer tap initialization values are pre-compensated for the phase rotation that will occur in the Fast Fourier Transformed OFDM signal output from FFT 46 after the fine adjustment of the FFT window. The pre-compensated equalizer tap initialization values are passed to a downstream equalizer 72 to facilitate initialization thereof.

As discussed above, the channel estimate may be passed through noise reduction unit or filter 56 (in the frequency domain) or through noise reduction unit or filter 64 (in the time domain) of the present invention. The noise reduction units 56 and 64 reduce the additive noise contained in the channel estimate. More specifically, in systems complying with the proposed ETSI or IEEE standards, the training symbol that is used to initialize a frequency-domain equalizer may be denoted by X and the frequency response of the channel may be denoted by C. The received signal is then $Y=C*X+N$, where N is additive channel noise. Conventional OFDM receivers set a channel response estimate C' equal to Y/X and compute the initial equalizer taps as 1/C' or X/Y. As a result, conventional OFDM receivers do not compensate for the presence of the additive noise. However, in transmission environments where the signal to noise ratio (SNR) is too low to obtain a reliable equalizer initialization without compensating for the additive noise, utilization of the noise reduction unit 56 or noise reduction unit 64 of the present invention increases the likelihood of reliable equalizer initialization.

Noise reduction unit 56 reduces the additive channel noise contained in the frequency-domain channel estimate by performing a low-order polynomial fit of the channel estimate to obtain the least-squares fit of the noisy channel estimate. Obtaining the least-squares fit of the noisy channel estimate is equivalent to "averaging" out the noise. The order of the polynomial is based on the order of a typical channel determined empirically by analyzing a collection of channel models to compute an estimate of the upper-bound of the polynomial order. A low-order polynomial fit will approximate the actual channel response which is changing slowly in frequency and will not follow the noisy which is changing rapidly in frequency.

Noise reduction unit 64 reduces the additive channel noise contained in the time-domain channel estimate by zeroing out any taps outside of a predetermined range centered around the main channel tap. The predetermined range is equivalent to the estimated order of the polynomial used in the low-order polynomial fit of noise reduction unit 56. Zeroing out the taps outside of the predetermined range preserves the significant taps of the channel response while discarding the low-power unreliable taps which are mostly related to the rapidly changing in frequency noise components of the channel response estimate.

Figure 6:
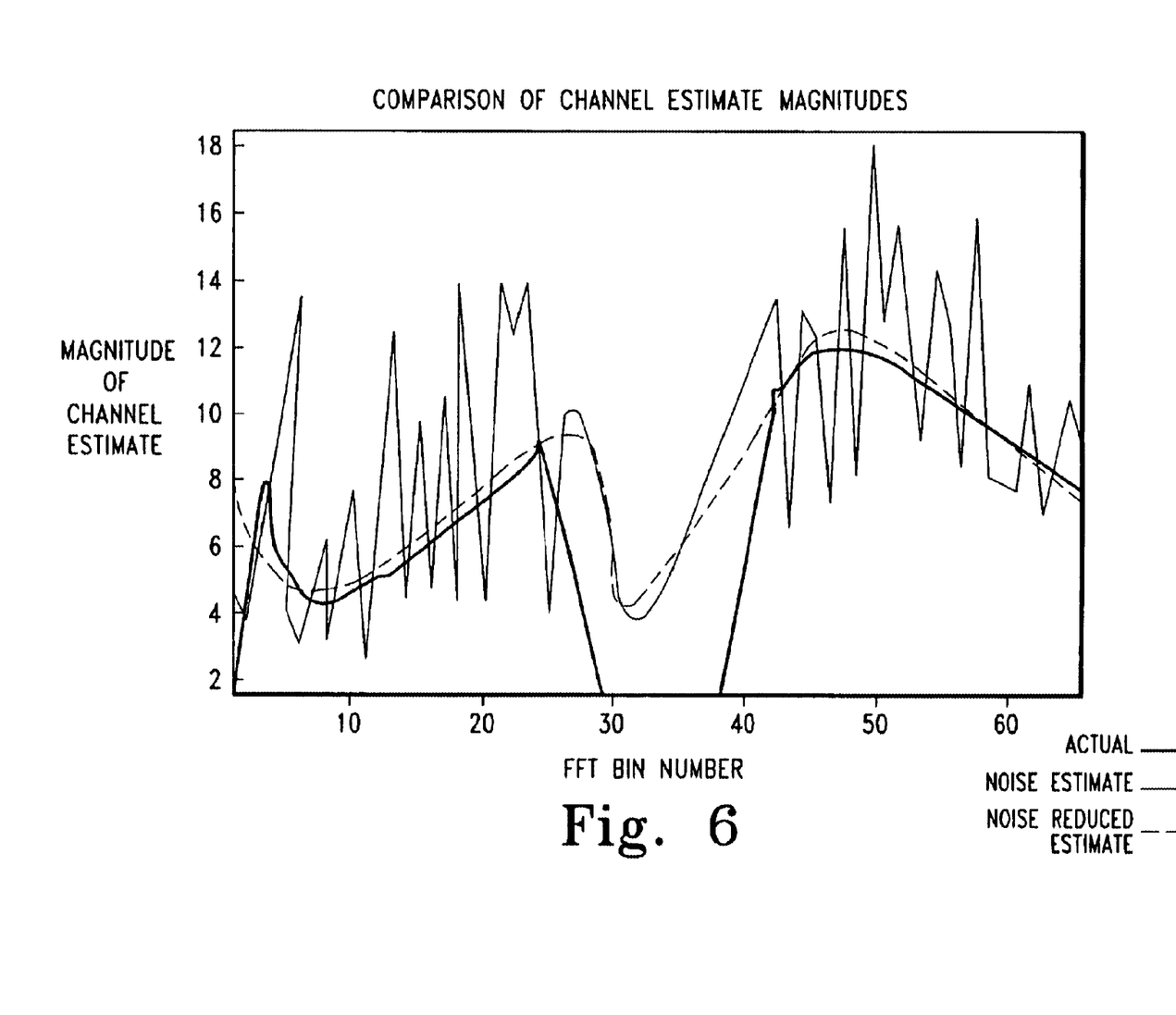
FIG. 6 is a graph comparing the magnitude of an actual channel frequency response with the magnitudes of noisy and noise-reduced channel estimates.
Figure 7:
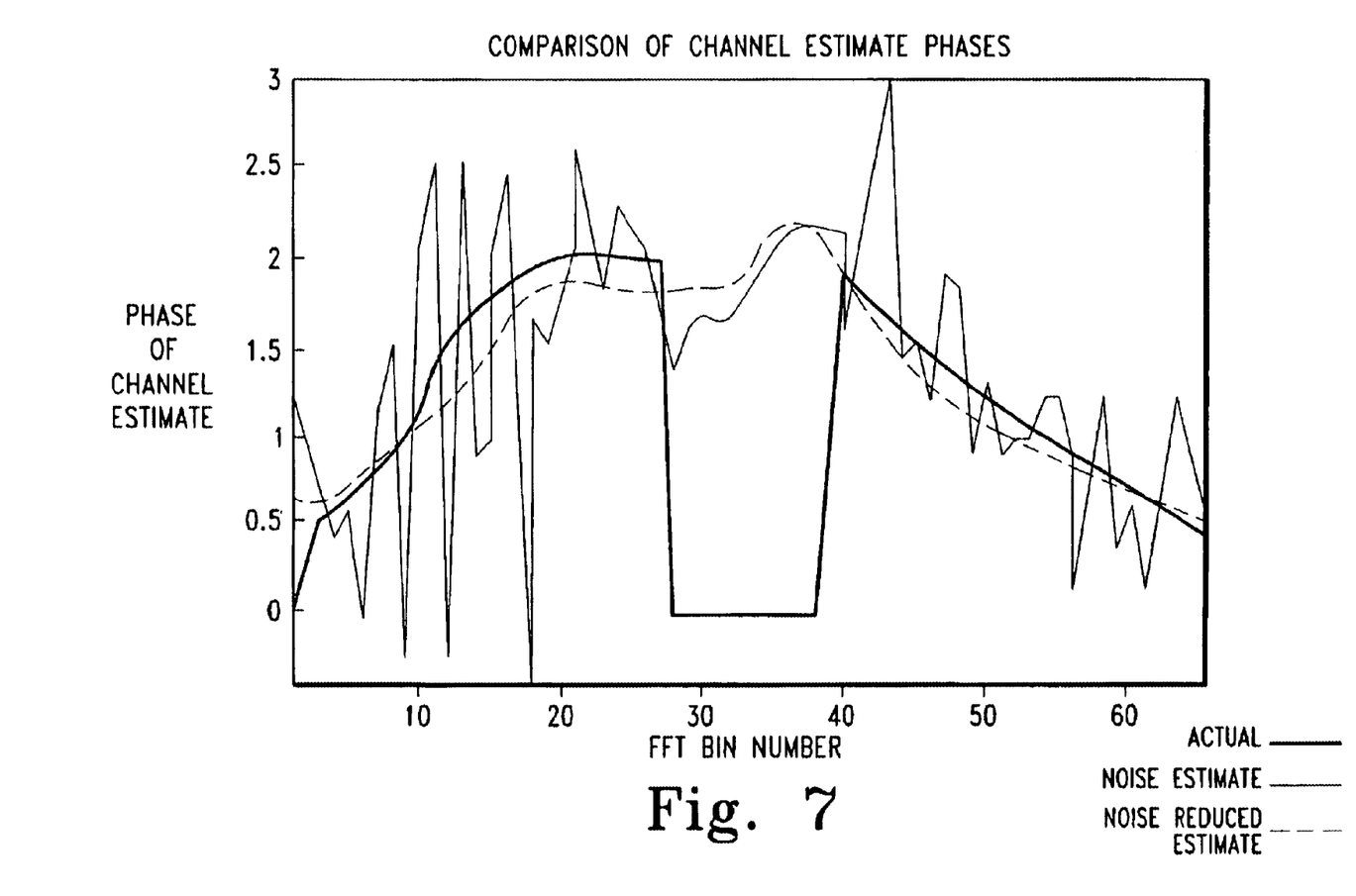
FIG. 7 is a graph comparing the phase of an actual channel frequency response with the phases of noisy and noise-reduced channel estimates.

Utilizing either noise reduction unit 56 or noise reduction unit 64 in a noisy environment results in a channel estimate that more closely approximates the actual channel frequency response in a noiseless environment, as shown in FIGS. 6 and 7.

Figure 8:
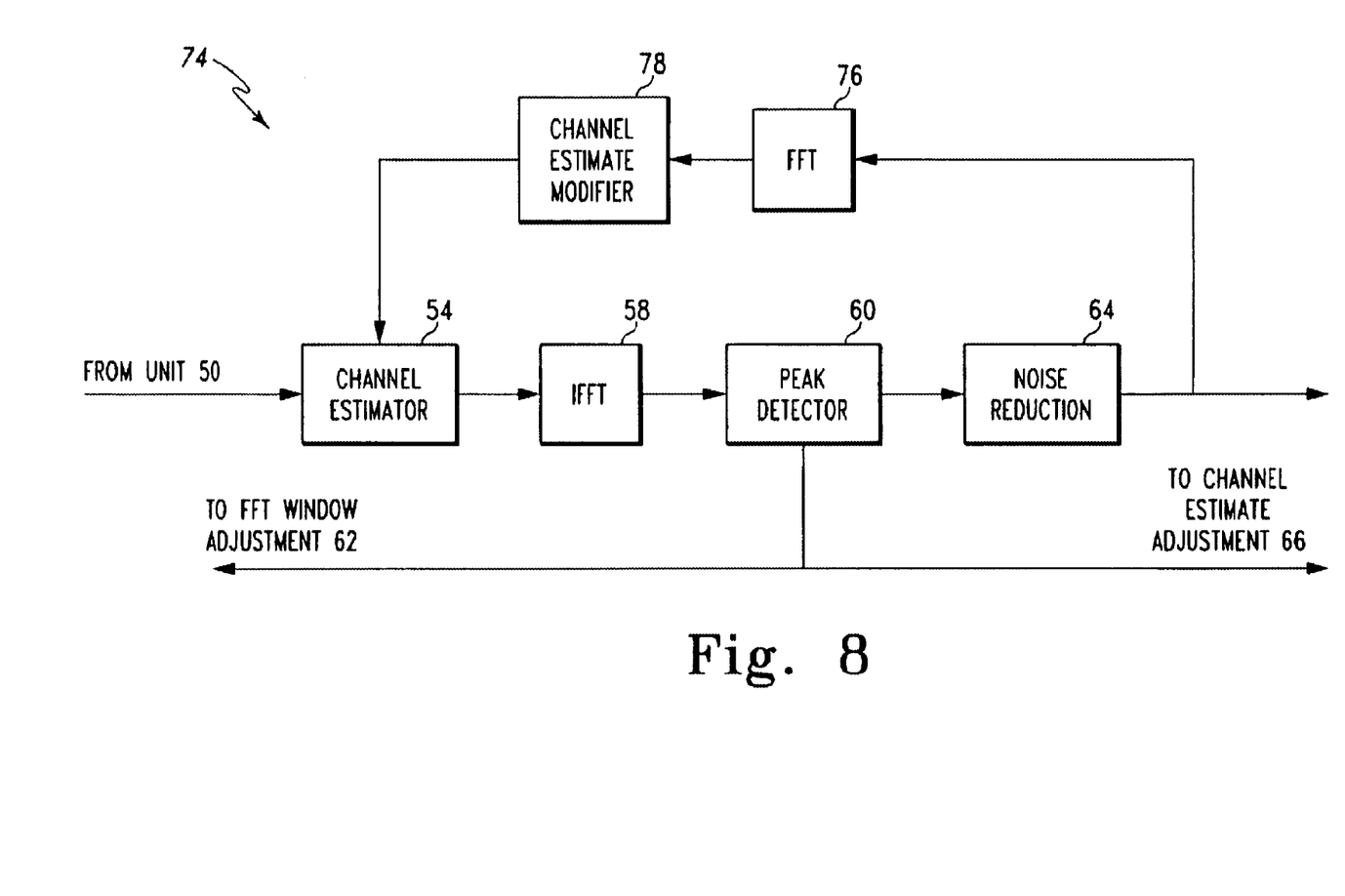
FIG. 8 is a block diagram illustrating a recursive filtering system for the window shift correction and equalizer tap initialization arrangement of the present invention.

Referring now to FIG. 8, a recursive noise reduction system 74 is shown. System 74 may be utilized when additional time is available for noise reduction (e.g., during initialization of a WLAN receiver or home networking terminal). System 74 includes the channel estimate unit 54, IFFT unit 58, peak detection unit 60, and noise reduction unit 64, described above, as well as an FFT unit 76 and channel estimate modifier 78 in a feedback loop between noise reduction unit 64 and channel estimate unit 54. In operation, channel estimate unit 54, as discussed above, forms an estimate of the channel frequency response. It should be noted that the channel estimate only represents a subset of the subcarriers carrying the training sequence. More specifically, in the proposed ETSI and IEEE standards only 52 of the 64 subcarriers in the training sequence have non-zero values while the other 12 subcarriers have zero values. Accordingly, when channel estimate unit 54 forms the estimate of the channel frequency response, channel estimate unit 54 sets the value of the 12 subcarriers to a default value (e.g., zero). The default value masks the actual values of the channel estimate for the 12 subcarriers. System 74 is utilized to approximate the masked values of the channel estimate, as discussed in further detail below.

The channel estimate is passed to IFFT unit 58 which applies an Inverse Fast Fourier Transform such that the frequency-domain channel estimate is transformed into a time-domain channel estimate. The time-domain channel estimate is passed to peak detector 60 which monitors the output of IFFT unit 58 for a maximum peak in the magnitude of the time-domain channel estimate, as discussed above. Peak detection unit 60 passes the time-domain channel estimate, via noise reduction unit 64, to channel estimate adjustment unit 66. Peak detection unit 60 also outputs an index of a maximum peak within the channel estimate to channel estimate adjustment unit 66 as well as to FFT window adjustment unit 62.

As discussed above, noise reduction unit 64 reduces the additive channel noise contained in the time-domain channel estimate by zeroing out any taps outside of a predetermined range centered around the main channel tap. In system 74, noise reduction unit 64 passes the time-domain channel estimate to channel estimate adjustment unit 66 after the channel estimate is fed back to channel estimate unit 54 a predetermined number of times. More specifically, the time-domain channel estimate is passed to FFT unit 76 which transforms the time-domain channel estimate into a frequency-domain channel estimate. Afterwards, the frequency-domain channel estimate is passed to channel estimate modifier 78 which modifies the channel estimate output from channel estimator 54. More specifically, channel estimate modifier 78 sets the masked subcarriers output from channel estimator 54 equal to the values of the corresponding subcarriers output from FFT unit 76. Channel estimate modifier 78 also sets the non-zero subcarriers (i.e., non-masked subcarriers) of the channel estimate equal to the values originally provided by channel estimator 54. After the recursive feedback occurs a predetermined number of times, noise reduction unit 64 passes the recursively filtered channel estimate to channel estimate adjustment unit 66 which further processes the channel estimate (now including approximations for the masked subcarriers), as described above.

Thus according to the principle of the present invention, an OFDM receiver extracts a training symbol from a fast Fourier transformed OFDM signal and processes the extracted training symbol to derive an FFT window adjustment factor and an associated equalizer tap initialization value. The OFDM receiver controls the position of an FFT window and the initialization of equalizer taps using the FFT adjustment factor and equalizer tap initialization value. The OFDM receiver preferably filters the fast Fourier transformed OFDM signal: to remove additive channel noise and increase the likelihood of reliable equalizer tap initialization in a low SNR environment.

While the present invention has been described with reference to the preferred embodiments, it is apparent that various changes may be made in the embodiments without departing from the spirit and the scope of the invention, as defined by the appended claims.

What is claimed is:

1. A method of processing an Orthogonal Frequency Division Multiplexed (OFDM) signal in an OFDM receiver, the method comprising the steps of:

Fast Fourier Transforming a received OFDM signal;

extracting a training symbol from the Fast Fourier Transformed OFDM signal;

processing the extracted training symbol to derive an FFT window adjustment value representing a window drift correction and an associated equalizer tap initialization value that is pre-compensated to negate the effect of the window drift correction on an equalizer tap; and controlling a position of an FFT window and an initialization of an equalizer tap using the FFT window adjustment value and the associated equalizer tap initialization value.

2. The method of claim 1, wherein the OFDM receiver is implemented in one of a wireless LAN adapter, home networking terminal, a portable terminal, and a desktop terminal.

3. The method of claim 1, wherein the step of processing the extracted training symbol includes the steps of:

deriving a channel response from the extracted training symbol; and obtaining the FFT window adjustment value and the associated equalizer tap initialization value from the derived channel response.

4. The method of claim 3, further including the step of:

filtering additive noise from the channel response.

5. The method of claim 4, wherein the step of filtering occurs in the time domain.

6. The method of claim 4, wherein the step of filtering occurs in the frequency domain.

7. The method of claim 3, further including the step of:

recursively filtering the channel response to approximate a value for a masked subcarrier within the channel response.

8. A system for processing an Orthogonal Frequency Division Multiplexed (OFDM) signal, the system comprising:

a Fast Fourier Transform (FFT) module coupled to a source of OFDM signals, the FFT module applying an FFT window to an OFDM signal to remove a cyclic prefix from the OFDM signal, and Fast Fourier Transforming the windowed OFDM signal;

an equalizer module coupled to the FFT module, the equalizer module removing a channel distortion from the transformed OFDM signal; and an adjustment module coupled to the FFT module and the equalizer module, the adjustment module extracting a training sequence from the transformed OFDM signal and, in response to the extracted training sequence, controlling the application of the FFT window such that an FFT window drift is corrected and an initialization of the equalizer module such that the equalizer module initialization values are pre-compensated for the FFT window drift correction.

9. The system of claim 8, wherein the system is implemented in one of a wireless LAN adapter, home networking terminal, a portable terminal, and a desktop terminal.

10. The system of claim 8, wherein the adjustment module includes:

a training sequence extraction unit coupled to the FFT module, the training sequence extraction unit extracting the training sequence from the transformed OFDM signal; and a channel response unit coupled to the training extraction unit, the channel response unit deriving a channel response from the extracted training sequence.

11. The system of claim 10, wherein the adjustment module further includes:

a peak detection unit coupled to the channel response unit, the peak detection unit detecting a maximum peak in the derived channel response;

an FFT window adjustment unit coupled to the peak detection unit and the FFT module, the FFT window adjustment unit adjusting the application of the FFT window in response to the detected maximum peak of the channel response; and a channel estimate adjustment unit coupled to the peak detection unit and the equalizer module, the channel estimate adjustment unit adjusting the initialization values of an equalizer tap of the equalizer module in response to the detected maximum peak of the channel response.

12. The system of claim 10, wherein the adjustment module further includes:

a noise reduction filter coupled to the channel response unit, the noise reduction filter filtering additive noise from the channel response.

13. The system of claim 12, wherein the noise reduction unit operates in the frequency domain.

14. The system of claim 12, wherein the noise reduction unit operates in the time domain.

15. The system of claim 12, wherein the noise reduction unit is a recursive filter that approximates a value for a masked subcarrier within the channel response.

16. An apparatus for correcting for a Fast Fourier Transform (FFT) window drift in an Orthogonal Frequency Division Multiplexing (OFDM) receiver, the apparatus comprising:

means for receiving an OFDM signal;

means for applying an FFT window to the received OFDM signal;

means for Fast Fourier Transforming the windowed OFDM signal;

means for equalizing the transformed OFDM signal;

means for detecting a window drift in the application of the FFT window; and means for adjusting the application of the FFT window to reduce the detected window drift and for adjusting the initialization of the means for equalizing such that the means for equalizing is pre-compensated for the effects of the reduction of the window drift.

17. The apparatus of claim 16, further comprising:

means for reducing noise in the transformed OFDM signal.

* * * * *